(12) United States Patent
Peng et al.

(10) Patent No.: US 11,596,041 B2
(45) Date of Patent: Feb. 28, 2023

(54) BRIGHTNESS ADJUSTMENT METHOD AND DEVICE, AND STORAGE MEDIUM

(71) Applicant: BEIJING XIAOMI MOBILE SOFTWARE CO., LTD., Beijing (CN)

(72) Inventors: Cong Peng, Beijing (CN); Wenjun Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 198 days.

(21) Appl. No.: 16/867,689

(22) Filed: May 6, 2020

(65) Prior Publication Data

US 2021/0227669 A1 Jul. 22, 2021

(30) Foreign Application Priority Data

Jan. 17, 2020 (CN) .......................... 202010053888.0

(51) Int. Cl.
*H05B 47/11* (2020.01)
*H05B 47/115* (2020.01)
(Continued)

(52) U.S. Cl.
CPC .............. *H05B 47/11* (2020.01); *G01S 13/04* (2013.01); *H05B 47/115* (2020.01); *H04W 52/027* (2013.01)

(58) Field of Classification Search
CPC ....... H05B 47/11; H05B 47/115; G01S 13/04; G01S 13/88; H04W 52/027;
(Continued)

(56) References Cited

U.S. PATENT DOCUMENTS

2012/0169236 A1* 7/2012 Kim ..................... H05B 31/50
315/127
2013/0229442 A1* 9/2013 Yang ................. H04W 52/0254
345/690
(Continued)

FOREIGN PATENT DOCUMENTS

CN 103137099 A 6/2013
CN 104044587 A 9/2014
(Continued)

OTHER PUBLICATIONS

Extended European Search Report dated Oct. 15, 2020 in European Patent Application No. 20173977.8, 8 pages.
(Continued)

*Primary Examiner* — Renan Luque
(74) *Attorney, Agent, or Firm* — Oblon, McClelland, Maier & Neustadt, L.L.P.

(57) ABSTRACT

The present disclosure relates to a brightness adjustment method and device, and a storage medium. The method can include detecting a brightness of an environment where a mobile terminal is located to acquire a brightness value. When a decrease of the brightness value acquired at a present moment relative to the brightness value acquired at a previous moment reaches a first preset value, a radar wave is transmitted, and an echo of the radar wave is detected. The method determines whether there is an occlusion causing the decrease of the acquired brightness value according to a transmitting parameter of the radar wave and an echo parameter of the echo. When there is no occlusion, display brightness of the mobile terminal is adjusted according to the brightness value acquired at the present moment. When the occlusion is present, the display brightness of the mobile terminal at the present moment is maintained.

12 Claims, 7 Drawing Sheets

(51) Int. Cl.
*G01S 13/04* (2006.01)
*H04W 52/02* (2009.01)

(58) Field of Classification Search
CPC ....... G09G 2320/06; G09G 2320/0626; G09G 2360/144; G09G 5/003; G09G 5/10; G09G 3/3406; Y02B 20/40
See application file for complete search history.

(56) References Cited

U.S. PATENT DOCUMENTS

| | | | |
|---|---|---|---|
| 2018/0095518 A1* | 4/2018 | Guo | G06F 1/3234 |
| 2018/0136363 A1* | 5/2018 | Yoon | G06F 1/3215 |
| 2018/0233113 A1* | 8/2018 | Zhou | G01S 17/88 |
| 2019/0113609 A1 | 4/2019 | Baheti et al. | |
| 2020/0363857 A1* | 11/2020 | Kosugi | G06F 1/1616 |
| 2020/0393890 A1* | 12/2020 | Hayashi | G01S 13/42 |

FOREIGN PATENT DOCUMENTS

| | | | |
|---|---|---|---|
| CN | 106548764 A | * | 3/2017 |
| CN | 106548764 A | | 3/2017 |
| CN | 109151202 A | | 1/2019 |
| EP | 2 600 218 A1 | | 6/2013 |
| EP | 3 471 197 A2 | | 4/2019 |

OTHER PUBLICATIONS

Combined Chinese Office Action and Search Report dated Jan. 10, 2022 in Patent Application No. 202010053888.0 (with English language translation), 15 pages.

Boxiao Chen, "Mordern Radar System Analysis and Design," Xidian University Press, Sep. 2012, 20 pages (with English language translation).

Combined Chinese Office Action and Search Report dated Jul. 25, 2022 in Chinese Patent Application No. 202010053888.0 (with English language translation), 26 pages.

* cited by examiner

BRIGHTNESS ADJUSTMENT METHOD AND DEVICE, AND STORAGE MEDIUM

CROSS-REFERENCE TO RELATED APPLICATIONS

This application is based upon and claims priority to Chinese Patent Application No. 202010053888.0, filed on Jan. 17, 2020, the entire content of which is incorporated herein by reference.

TECHNICAL FIELD

The present disclosure generally relates to the field of information processing, and more particularly, to a brightness adjustment method and device, and a storage medium.

BACKGROUND

A mobile terminal is usually configured with a high-brightness display screen and supports rich multimedia data services Such a configuration can provide the battery life of a mobile phone with great challenges. Backlight of the display screen of the mobile terminal is relatively power-consuming, so that the mobile terminal is set with a function of automatically adjusting the backlight of the display screen according to an environment where a user is located. Such a technique can effectively reduce power consumption and prolong the battery life. In addition, a good automatic backlight adjustment function may bring a more comfortable visual experience to the user. However, an occlusion condition frequently occurs in daily use, and existence of an occlusion makes data reported by a light sensor in the mobile terminal inaccurate. This can result is a rapid reduction of the backlight of the mobile terminal and great influence on user experience.

SUMMARY

The present disclosure provides a brightness adjustment method and device, and a storage medium.

According to a first aspect of the disclosure, a brightness adjustment method is provided that can be applied to a mobile terminal. The method can include that a brightness of an environment where the mobile terminal is located is detected to acquire a brightness value, and, when a decrease of the brightness value acquired at a present moment relative to the brightness value acquired at a previous moment reaches a first preset value, a radar wave is transmitted, and an echo of the radar wave is detected. The method further includes determining whether there is an occlusion causing the decrease of the acquired brightness value according to a transmitting parameter of the radar wave and an echo parameter of the echo, when there is no occlusion, adjusting a display brightness of the mobile terminal according to the brightness value acquired at the present moment, and, when there is the occlusion, the display brightness of the mobile terminal at the present moment is maintained.

According to a second aspect of embodiments of the present disclosure, a brightness adjustment device is provided, which can include a detection unit that is configured to detect brightness of an environment where a mobile terminal is located to acquire a brightness value, and a transceiver unit that is configured to, when a decrease of the brightness value acquired at a present moment relative to the brightness value acquired at a previous moment reaches a first preset value, transmit a radar wave and detect an echo of the radar wave. The device can further include a determination unit that is configured to determine whether there is an occlusion causing the decrease of the acquired brightness value according to a transmitting parameter of the radar wave and an echo parameter of the echo, and an adjustment unit that is configured to, when determining that there is no occlusion, adjust display brightness of the mobile terminal according to the brightness value acquired at the present moment and, when determining that there is the occlusion, maintain the display brightness of the mobile terminal.

According to a third aspect of the disclosure, a brightness adjustment device is also provided, which can include a processor and a memory configured to store instructions executable by the processor. The processor is configured to execute the executable instructions stored in the memory to implement any method of the first aspect.

According to a fourth aspect of the disclosure, a non-transitory computer-readable storage medium is provided, instructions in the storage medium are executed by a processor of a brightness adjustment device to enable the brightness adjustment device to execute any method of the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A mobile terminal can be operated different environments, and due to different brightness, the mobile terminal, after a light sensor in the mobile terminal acquires brightness, may adjust display brightness of the mobile terminal according to an acquired brightness value. For example, the brightness value is relatively high outdoors, and the mobile terminal may automatically increase the display brightness of the mobile terminal according to the acquired brightness value. Similarly, the brightness value is relatively low in a relatively dark room, for avoiding eyes being hurt by excessively high brightness of a screen of the mobile terminal, the display brightness of the mobile terminal may be automatically decreased according to the acquired brightness value.

However, during a practical application, an occlusion condition may usually occur. Due to existence of an occlusion, the brightness value acquired by the light sensor in the mobile terminal at a present moment may be relatively low, but the brightness of the environment where the mobile terminal is located at this moment may still be high. In such case, a misjudgment may be made if the display brightness is adjusted based on the brightness value acquired under the existence of the occlusion. For example, when a vehicle passes in front of the mobile terminal, the brightness value acquired at the present moment is relatively low, and the display brightness, if being adjusted due to the occlusion, may not be matched with the brightness of the environment where the mobile terminal is located. However, after the vehicle leaves, the brightness value is recovered, and an adjustment is required again. Therefore, if the display brightness is adjusted due to occurrence of the occlusion, the display brightness may be adjusted repeatedly, resulting in higher consumption of the mobile terminal and poor user experience.

Figure 1:
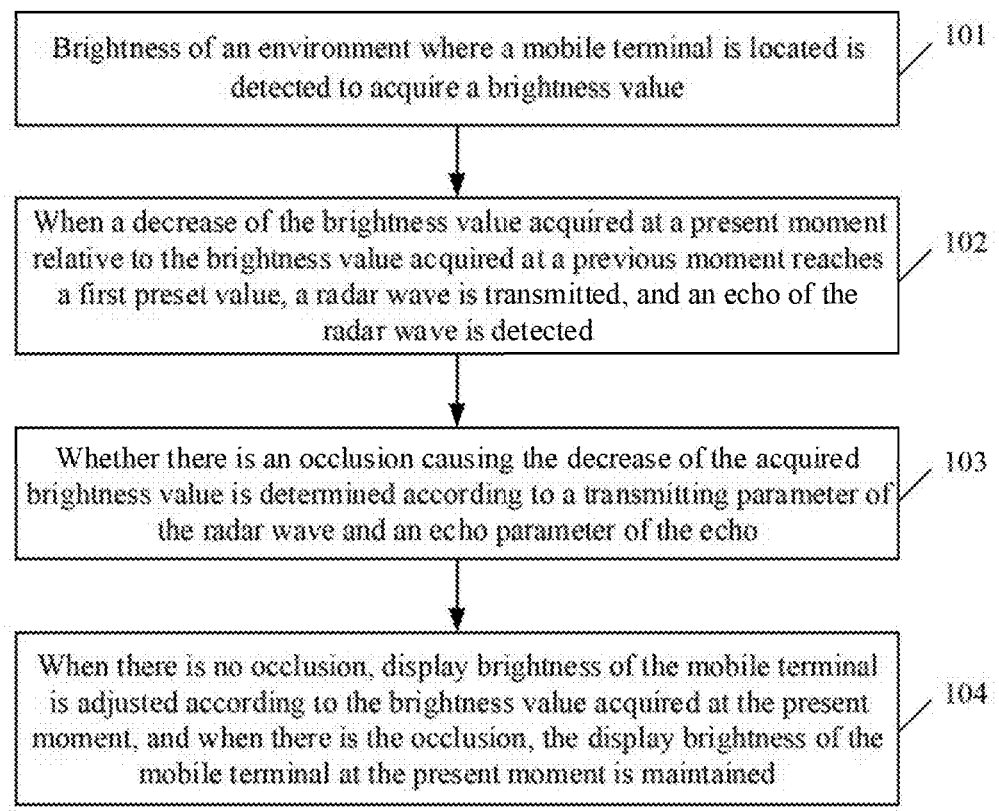
FIG. 1 is a first flow chart showing a brightness adjustment method, according to an exemplary embodiment.

For improving adjustment accuracy of display brightness of a mobile terminal, embodiments of the present disclosure provide a brightness adjustment method. FIG. 1 is a first flow chart showing a brightness adjustment method, according to an exemplary embodiment. As illustrated in FIG. 1, the method is applied to a mobile terminal and includes the following steps.

In Step 101, brightness of an environment where the mobile terminal is located is detected to acquire a brightness value.

In Step 102, when a decrease of the brightness value acquired at a present moment relative to the brightness value acquired at a previous moment reaches a first preset value, a radar wave is transmitted, and an echo of the radar wave is detected.

In Step 103, whether there is an occlusion causing the decrease of the acquired brightness value is determined according to a transmitting parameter of the radar wave and an echo parameter of the echo.

In Step 104, when there is no occlusion, display brightness of the mobile terminal is adjusted according to the brightness value acquired at the present moment, and when there is the occlusion, the display brightness of the mobile terminal at the present moment is maintained.

It is to be noted that, since the display brightness of the mobile terminal is required to be adjusted, the mobile terminal may be a mobile electronic device with a display module, for example, a smart phone, a notebook computer, a tablet computer, a wearable electronic device, and the like.

It is also to be noted that, since the mobile terminal is required to transmit the radar wave and receive the echo of the radar wave, a radar component is required to be installed on the mobile terminal. The radar component includes a transmitter, a transmitting antenna, a receiver and a receiving antenna. Herein, the transmitting antenna and the receiving antenna may be the same antenna and may also be different antennae. When the transmitting antenna and the receiving antenna are the same antenna, the antenna is simultaneously coupled to the transmitter and the receiver. When the transmitting antenna and the receiving antenna are different antennae, the transmitting antenna is coupled to the transmitter, and the receiving antenna is coupled to the receiver. The transmitting antenna is configured to transmit the radar wave, and the receiving antenna is configured to receive the echo.

Herein, after the radar wave is transmitted, if there is an object in a transmission process of the radar wave, the object may receive part of the radar wave and reflect the part of the radar wave. Therefore, whether there is the object in the transmission process of the radar wave may be determined according to whether the receiving antenna of the radar component receives the echo.

The transmitting parameter of the radar wave includes a transmitting angle, transmitting time, a transmitting frequency, transmitting power, and the like. The echo parameter of the echo includes a receiving angle, receiving time, a receiving frequency, receiving power, and the like.

Whether there is the occlusion causing the decrease of the acquired brightness value around the mobile terminal may be determined based on the transmitting parameter and the echo parameter. Herein, determination of the occlusion based on the transmitting parameter and the echo parameter may be implemented by the following operations. For example, when the mobile terminal and the object are relatively still, whether the object is close to or far away from the mobile terminal may be determined based on the transmitting power and the receiving power. Further, a specific distance between the object and the mobile terminal may be determined based on the transmitting time, the receiving time and a transmission rate of the radar wave. Also, when at least one of the mobile terminal or the object moves, a moving speed of the object relative to the mobile terminal may be determined based on the transmitting frequency and the receiving frequency.

Specifically, for the mobile terminal and object that are relatively still, the transmitting angle of the radar wave and the receiving angle of the echo are the same, and if there is the object in the transmission process of the radar wave, the receiving power of the received echo is less than the transmitting power due to attenuation in the transmission process, and then whether the object is close to or far away from the mobile terminal may be determined according to a difference value between the receiving power and the transmitting power. Furthermore, if the specific distance between the occlusion and the mobile terminal is to be determined, the specific distance between the object and the mobile terminal may be determined by a product of a time difference between the transmitting time and the receiving time and the transmission rate of the radar wave. In addition, if at least one of the mobile terminal or the object moves, the frequency of the received echo may change, so that the moving speed of the object relative to the mobile terminal may be determined by a difference value between the transmitting frequency and the receiving frequency.

Based on the above descriptions, each parameter may be determined according to the transmitting parameter and the echo parameter, and each parameter may further be analyzed to determine whether there is the occlusion causing the decrease of the acquired brightness value around the mobile terminal.

Figure 2:
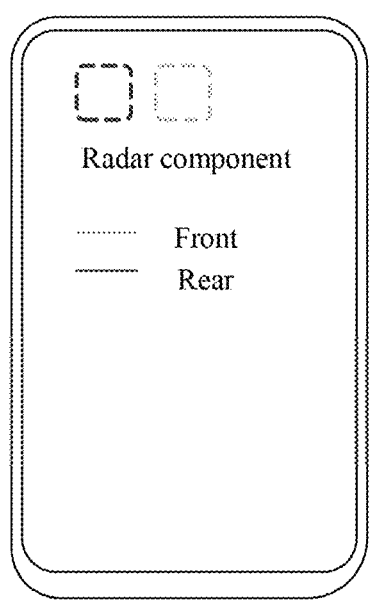
FIG. 2 is a schematic diagram illustrating a mobile terminal with a radar component, according to an exemplary embodiment.

FIG. 2 is a schematic diagram illustrating a mobile terminal with a radar component, according to an exemplary embodiment. As illustrated in FIG. 2, two radar components may be arranged on the mobile terminal, for example, a front radar component on a display screen of the mobile terminal, and a rear radar component on a surface which is opposite to the display screen of the mobile terminal.

The mobile terminal is further provided with a light sensing module, and the light sensing module may be a light sensor or a brightness sensor. Specifically, the operation in Step 101 that the brightness of the environment where the mobile terminal is located is detected may be implemented through the light sensor. The light sensor may be a photoresistor and is configured to convert an optical signal into an electric signal. Therefore, a component such as the display module and the like may be controlled through the electric signal.

The brightness of the environment specifically refers to the amount of light of the environment, and the brightness value refers to a numerical value corresponding to quantification of the obtained amount of the light. During a practical application, for conveniently comparing a magnitude of the acquired amount of the light, it is necessary to quantify the acquired amount of the light and further compare the numerical value obtained by quantification to determine the magnitude.

It is also to be noted that the light sensor senses and feeds back a light intensity of the environment to the mobile terminal to implement a periodic or real-time automatic adjustment of the brightness of the screen. For example, the light sensor acquires the brightness of the environment where the mobile terminal is located every two seconds or every second. Based on this, the decrease of the brightness value detected at the present moment relative to the brightness value detected at the previous moment in Step 102 refers to a difference between brightness values acquired at adjacent moments. For example, if the light sensor acquires the brightness of the environment where the mobile terminal is located every two seconds and the present moment is 13:50:50, the brightness value detected at the present moment is acquired at 13:50:50, and the brightness value detected at the previous moment is acquired at 13:50:48.

The decrease of the brightness of the environment where the mobile terminal is located may be determined by subtracting the brightness values acquired at the adjacent moments. During the practical application, since the brightness of the environment may usually fluctuate a little bit, for avoiding resource waste caused by radar wave transmitting for normal fluctuation, the first preset value is set to ensure accuracy of a transmitting opportunity of the radar wave in embodiments of the present disclosure.

In embodiments of the present disclosure, the radar component is adopted to detect whether there is an occlusion in the environment where the mobile terminal is located because the radar component, compared with a conventional distance sensor (for example, an infrared distance sensor), may radiate a longer distance. Moreover, infrared distance sensor-based object detection may only judge whether there is an object in the environment based on whether an infrared receiving diode receives a reflected signal, and may acquire a distance parameter relative to the object such that more information of the object cannot acquired. In embodiments of the present disclosure, based on the transmitting parameter of the radar wave and the echo parameter of the echo, whether there is the object may be determined, and information such as the distance parameter of the object and a contour parameter of the object may also be acquired, namely more information is obtained. Therefore, information of the occlusion may be determined accurately based on the acquired information, and the display brightness of the mobile terminal may be adjusted more accurately.

Therefore, once it is determined according to the transmitting parameter and the echo parameter that there is no occlusion, it may be considered that the brightness of the environment actually changes greatly. It is necessary to adjust the display brightness of the mobile terminal to be adapted to new brightness so as to facilitate the use of the mobile terminal for a user.

As an example, the brightness value acquired in an open environment where a lamp is turned on at night is 80, if there is no obstacle influencing the detected brightness in the open environment, the brightness value detected after the lamp in the open environment is turned off may be 10. If the first preset value is 50, the decrease of the brightness value reaches the first preset value. However, since no obstacle is detected, this condition means that the brightness of the environment actually changes greatly, and it is necessary to adjust the display brightness of the mobile terminal to be matched with the present dark environment.

According to embodiments of the present disclosure, when the brightness of the environment where the mobile terminal is located changes greatly, whether there is an occlusion causing the decrease of the acquired brightness value in the environment where the mobile terminal is located is determined in a manner of transmitting the radar wave and detecting the echo of the radar wave. When it is determined that there is no occlusion, the display brightness of the mobile terminal is adjusted. Therefore, whether the brightness of the environment changes greatly due to the occlusion may be judged according to the echo of the radar wave; misjudgments, caused by influence of existence of the occlusion on the light sensor, in an automatic adjustment of the brightness of the display screen may be greatly reduced; the display brightness may be adjusted more accurately, and user experience of the mobile terminal may be improved.

It is to be noted that the occlusion is an object between a light source and the mobile terminal.

As described above, if it may be determined according to detection of the radar wave that there is an occlusion causing the decrease of the acquired brightness value in the environment where the mobile terminal is located, it is very likely that the decrease of the brightness value reaching the first preset value is caused by the occlusion rather than actual brightness changes of the environment. In such case, if the display brightness of the mobile terminal is adjusted, the display brightness of the mobile terminal may be adjusted again when the occlusion changes. For example, the occlusion is moving and may not be an occlusion causing the decrease of the acquired brightness value at a next moment, which may consequently cause repeated changing of the display brightness in a short time and influence the user experience.

As an example, the brightness value acquired in the open environment where the lamp is turned on at night is 80 LUX. LUX is a unit of the brightness value and refers to a luminous flux received by the object per square meter when the light source vertically irradiates the object. If the mobile terminal reaches a position where the detected/acquired brightness value is influenced by an occlusion due to a movement of the user, as illustrated in FIG. 3.

Figure 3:
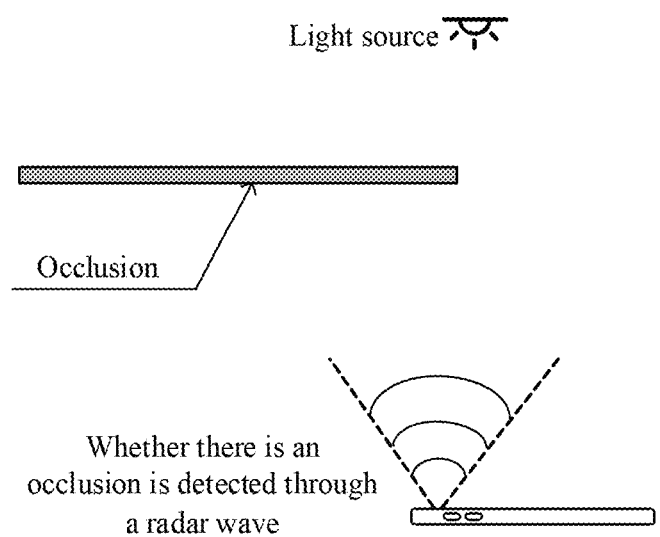
FIG. 3 is schematic diagram illustrating that a mobile terminal is at a position where a detected brightness value is influenced by an obstacle.

FIG. 3 is a schematic diagram illustrating that a mobile terminal is at a position where a detected brightness value is influenced by an obstacle. In FIG. 3, light emitted by the light source is blocked due to existence of the obstacle to decrease the brightness value acquired by the light sensor of the mobile terminal to 5 LUX. If the first preset value is 50 LUX, the decrease of the brightness value reaches the first preset value. However, since the obstacle is detected, if a judgment is made purely according to that the decrease of the brightness value reaches the first preset value, the display brightness may be adjusted. However, since it may be a temporary occlusion causing the decrease of the acquired brightness value and original brightness is usually recovered at the next moment, the display brightness is adjusted to the original brightness again, which increases unnecessary consumption of the mobile terminal. Moreover, this condition does not mean that the brightness of the environment actually changes greatly, and equivalently, the brightness of the environment where the mobile terminal is located is misjudged.

Herein, the first preset value refers to a threshold value configured to trigger the display brightness of the mobile terminal to be adjusted. A specific acquisition manner for the first preset value may be determined according to a user input; namely, before the brightness of the mobile terminal is adjusted, the user inputs a value, and after the mobile terminal acquires the value, the decrease of the brightness value is compared with the value. The specific acquisition manner for the first preset value may also be determined according to an empirical value; namely a change value that may trigger an adjustment of the display brightness in this art is determined as the first preset value. For example, at present, the display brightness value may be adjusted once if a change of the brightness value exceeds 20 LUX in this art, so that the first preset value is 20 LUX.

Based on this, according to embodiments of the present disclosure, if it is determined by detection of the radar wave that there is an occlusion causing the decrease of the acquired brightness value, the display brightness of the mobile terminal at the present moment is maintained, namely the display brightness at the present moment is not adjusted. Therefore, misjudgments, caused by the influence of the existence of the occlusion on the light sensor, in an automatic adjustment of the brightness of the display screen may be greatly reduced.

Figure 4:
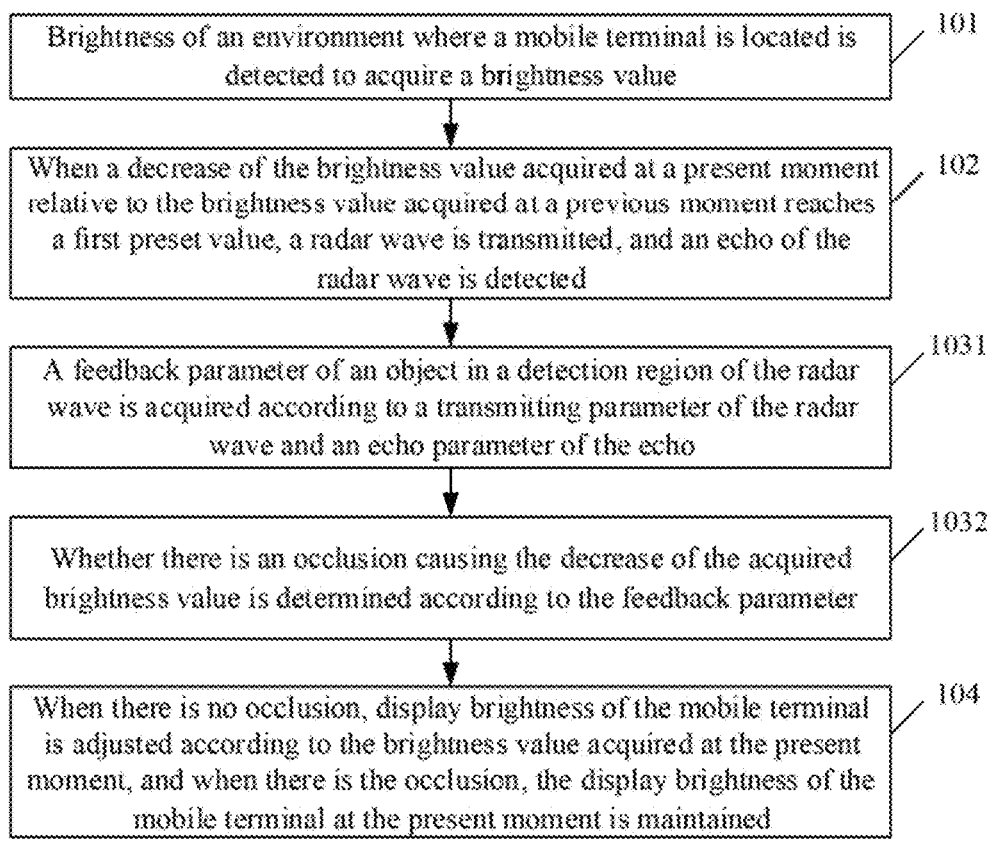
FIG. 4 is a second flow chart showing a brightness adjustment method, according to an exemplary embodiment.

In some embodiments, FIG. 4 is a second flow chart showing a brightness adjustment method, according to an exemplary embodiment. As illustrated in FIG. 4, the operation in Step 103 that whether there is the occlusion causing the decrease of the acquired brightness value is determined according to the transmitting parameter of the radar wave and the echo parameter of the echo includes the following steps.

In Step 1031, a feedback parameter of an object in a detection region of the radar wave is acquired according to the transmitting parameter of the radar wave and the echo parameter of the echo.

In Step 1032, whether there is the occlusion causing the decrease of the acquired brightness value is determined according to the feedback parameter.

As described above, the transmitting parameter of the radar wave includes the transmitting frequency and the transmitting power, and the echo parameter of the echo includes the receiving frequency and the receiving power. The transmitted radar wave may usually cover a certain range in a transmission process, and the covered range is the detection region of the radar wave. There may be multiple objects in the range, and some objects may influence the acquired brightness value but some may not. Therefore, it is necessary to acquire feedback parameters of all the objects in the detection region of the radar wave, whether there is an object causing the decrease of the acquired brightness value in the objects is further determined based on the feedback parameters, and if there is the object causing the decrease of the acquired brightness value, it may be determined as an occlusion.

Therefore, in such a manner of acquiring the feedback parameters of all the objects in the detection region of the radar wave and determining whether there is an occlusion causing the decrease of the acquired brightness value in all the objects based on the feedback parameters, accuracy of judging whether there is the occlusion causing the decrease of the acquired brightness value in the environment may further be improved based on relatively more acquired detection information.

Furthermore, it is to be noted that, in some embodiments, the feedback parameter includes a distance parameter. That is, the distance parameter of the object in the detection region of the radar wave may be acquired according to the transmitting parameter of the radar wave and the echo parameter of the echo.

In embodiments of the present disclosure, the detection region of the radar wave may specifically be determined by a direction of the transmitting antenna of the radar component. The distance parameter includes a distance value between the object in the detection range of the radar wave and the mobile terminal.

Herein, the distance parameter includes the distance value. An acquisition manner for the distance value may include that: elapsed time between the transmitting time of the radar wave and the receiving time when the echo is received is acquired; and the distance value between the object and the mobile terminal is obtained based on the elapsed time and the light speed. The elapsed time may be determined by the time when the transmitter of the radar component transmits the radar wave and the time when the receiver of the radar component receives the echo together.

Based on the acquired distance parameter, the operation in Step 1032 that whether there is the occlusion causing the decrease of the acquired brightness value is determined according to the feedback parameter can include that, whether there is the occlusion of which a distance to the mobile terminal is in a preset occlusion distance range is determined according to the distance parameter.

Herein, as described above, for example, the user walks in a street, and there are many objects in the street. A far object may be detected by the radar component but may not influence the detected brightness value because it is relatively far away from the mobile terminal, so that it may not be an occlusion causing the decrease of the acquired brightness value. Therefore, the occlusion causing the decrease of the acquired brightness value is required to be determined from the objects in the preset occlusion distance range.

The preset occlusion distance range refers to a distance range with influence on the detected brightness value. The preset occlusion distance range is required to be determined according to a type of the object, and different objects may correspond to different preset occlusion distance ranges. For example, a large vehicle in a range with the mobile terminal as the center and a radius of 2M may influence the brightness value detected by the mobile terminal, but a person in the range with the mobile terminal as the center and the radius of 2M may not influence the brightness value detected by the mobile terminal. Therefore, the preset occlusion distance range may be determined according to a practical condition.

Based on this, according to embodiments of the present disclosure, the object of which the distance to the mobile terminal is in the preset occlusion distance range is determined according to the acquired distance parameter, and only the object in the preset occlusion distance range may be an occlusion causing the decrease of the acquired brightness value. The distance parameter is acquired to provide a judgment basis for accurately determining whether there is the occlusion causing the decrease of the acquired brightness value in the environment.

It is to be noted that, in some embodiments, the feedback parameter includes a contour parameter. That is, the contour parameter of the object in the detection region of the radar wave may be acquired according to the transmitting parameter of the radar wave and the echo parameter of the echo.

The contour parameter includes an outer contour parameter. The outer contour parameter refers to information included in an outer edge of the object in the detection range of the radar wave, and includes a general appearance characteristic of the object. In an embodiment, the outer contour parameter may be a coordinate value of each point on the outer edge of the object, and a general shape of the object may be determined based on the coordinate value of each point. For example, it may be determined according to the contour parameter of a four-wheel-drive vehicle that the four-wheel-drive vehicle is generally a cuboid.

Based on the acquired contour parameter, the operation in Step 1032 that whether there is the occlusion causing the decrease of the acquired brightness value is determined according to the feedback parameter can include that, whether the object is the occlusion is determined according to the contour parameter.

Herein, since there are many objects in the detection range of the radar wave, whether the object is the occlusion causing the decrease of the brightness value may further be determined according to the measured contour parameter of the object.

Specifically, the operation that whether the object is the occlusion is determined according to the contour parameter can include that an occlusion shape of the object is determined according to the contour parameter, and, whether there is an occlusion of which the occlusion shape is in a preset occlusion degree range is determined according to the occlusion shape.

Under some conditions, an object is detected in the preset occlusion distance range, but the object does not occlude the light sensing module of the mobile terminal due to its own contour or other reasons, and the detected brightness value may decrease due to decrease of the brightness of the external environment. In such case, it is apparently inappropriate to determine the object as an occlusion. Therefore, for reducing misjudgments caused by such conditions, in the implementation mode, the contour parameter of the object in the preset occlusion distance range is further detected through the radar wave, and whether the object is an occlusion is further judged. Misjudgment conditions are reduced.

As described above, the contour parameter includes the outer contour parameter, and the outer contour parameter refers to the information included in the outer edge of the object in the detection range of the radar wave, and is configured to describe the general outer appearance characteristic of the object. In such case, the occlusion shape of the object may be determined according to the contour parameter.

During the practical application, some objects have relatively small contours and thus may not influence the detected brightness value. For example, the user holding the mobile terminal stands by a road, and a dog on the road may not greatly influence the detected brightness value no matter whether its distance to the mobile terminal is in the preset occlusion distance range or not in the preset occlusion distance range. Therefore, in embodiments of the present disclosure, whether there is the occlusion causing the decrease of the acquired brightness value in the environment may further be judged by acquiring the contour parameter of the object, and making a judgment from another angle may reduce misjudgments better.

The preset occlusion degree range refers to an occlusion range in which the decrease of the brightness value detected by the mobile terminal reaches the first preset value. The preset occlusion degree range may be determined according to a sensing direction of the light sensor in the mobile terminal. During the practical application, different attitudes of the mobile terminal may differ the sensing directions of the light sensor and thus may correspond to different sensing ranges. For example, when the mobile terminal is horizontally placed on a desktop, namely its attitude is parallel to the desktop, the sensing direction of the light sensor in the mobile terminal is a direction parallel to the desktop, and the preset occlusion degree range is a range in the direction parallel to the desktop and in a sensing range of the light sensor.

It is also to be noted that, during the practical application, some objects are relatively close to the mobile terminal but may not influence the detected brightness value. For example, the user holding the mobile terminal stands by the road, and if the user and the mobile terminal are under the sun, even though there is a high building on the road, the high building, even though being relatively close to the mobile terminal, may not influence the detected brightness value due to an irradiation angle of the sun. The high building may have a corresponding occlusion shape, but the occlusion shape is not in the preset occlusion degree range set for the mobile terminal and may not greatly influence the detected brightness value of the mobile terminal, so that it is not an occlusion causing the decrease of the acquired brightness value.

Therefore, according to embodiments of the present disclosure, in the manner of determining the occlusion based on the occlusion shape of the object, many objects that have relatively large occlusion shapes but may not greatly influence the detected brightness value of the mobile terminal in the detection range of the radar wave may be excluded, and the accuracy of judging whether there is the occlusion causing the decrease of the acquired brightness value in the environment may be improved.

It is to be noted that, in embodiments of the present disclosure, the object of which the occlusion shape is in the preset occlusion degree range in the objects in the preset occlusion distance range may further be determined based on the contour parameter on the basis of determining whether there is the object of which the distance to the mobile terminal is in the preset occlusion distance range based on the distance parameter. Therefore, the accuracy of judging whether there is the occlusion causing the decrease of the acquired brightness value may further be improved by multiple judgments.

In some embodiments, the method further can include that whether the brightness value acquired at the present moment is lower than a second preset value is determined, the second preset value being lower than the first preset value, when the brightness value acquired at the present moment is lower than the second preset value, whether there is a cover covering a display module of the mobile terminal is determined according to the transmitting parameter of the radar wave and the echo parameter of the echo, and, when there is the cover covering the display module, a screen of the mobile terminal is controlled to be turned off.

Herein, the second preset value is configured to determine whether the detected brightness value of the mobile terminal at the present moment is extremely low. Whether the amount of light received by the light sensor of the mobile terminal is extremely small may be determined according to whether the detected brightness value is lower than the second preset value. The second preset value may be set to be 5 LUX or 2 LUX, etc.

In some embodiments, the display module includes a display screen. When the display screen is a liquid crystal display screen, the display module further includes a backlight source. The backlight source, as a light source, is positioned at the back of the liquid crystal display screen. The liquid crystal display screen presents a display resource to the user through the light provided by the backlight source.

In some other embodiments, the display module may include an organic light-emitting diode (OLED) screen.

Covering the display module of the mobile terminal may specifically refer to covering the display screen of the display module.

During the practical application, if it is detected that the detected brightness value of the mobile terminal at the present moment is extremely low, there may be two conditions. In the first condition, the brightness of the environment does not change, but the amount of the light received by the light sensor of the mobile terminal becomes extremely low because of an emergency. In the second condition, the brightness of the whole environment changes, and the amount of the light received by the light sensor of the mobile terminal becomes extremely low. Since the second condition is a normal condition, when the brightness of the whole environment changes, the display brightness of the mobile terminal is required to be normally adjusted to be adapted to a change of the environment. For the first condition, the display screen of the mobile terminal may be covered by a cover. For example, the brightness value detected at the present moment is extremely low because the mobile terminal is placed in a manner that the display screen presently in a display state contacts with the desktop, for example, the brightness value at the present moment is 0 LUX, and in such case, the desktop may be considered as the cover. Or, the brightness value detected at the present moment is extremely low because the mobile terminal is presently in a pocket of a garment, and in such case, the garment is the cover covering the display screen of the mobile terminal.

In the first condition, since the brightness value of the mobile terminal suddenly becomes extremely low, it is usually considered that there is an emergency such that the display screen of the mobile terminal is covered by the cover in a process of using the mobile terminal by the user. As described in the above examples, since the display screen of the mobile terminal is covered by the cover when being in the display state and, in such case, the user does not look at the display screen and may not watch a content displayed on the display screen, it is unnecessary to maintain the display brightness. Considering the problem of power consumption of the mobile terminal, the mobile terminal may be directly controlled for screen locking processing, namely the display screen is turned off.

Embodiments of the present disclosure are mainly for the first condition. That is, if the two conditions that the decrease of the brightness value acquired at the present moment relative to the brightness value acquired at the previous moment reaches the first preset value and the brightness value acquired at the present moment is lower than the second preset value are met, whether there is the cover covering the display screen of the mobile terminal may be determined according to the transmitting parameter of the radar wave and the echo parameter of the echo; and if it is detected that there is the occlusion of which the distance to the mobile terminal is in the preset occlusion distance range and the occlusion shape is in the preset occlusion degree range, it may be determined that the first condition occurs to the mobile terminal. In such case, for reducing unnecessary consumption of the mobile terminal, the mobile terminal may be directly controlled for screen locking processing.

As an example, there is made such a hypothesis that the first preset value is 50 LUX and the second preset value is 2 LUX, and if the brightness value acquired at the previous moment is 60 LUX and the brightness value acquired at the present moment is 0 LUX, the decrease of the brightness value reaches the first preset value, and the brightness value acquired at the present moment is lower than the second preset value. After the radar wave is transmitted, if it is determined according to the transmitting parameter and the echo parameter that there is the occlusion of which the distance to the mobile terminal is in the preset occlusion distance range and/or that there is the occlusion of which the occlusion shape is in the preset occlusion degree range, it may be determined that the acquired brightness value is 0 LUX because there is the cover covering the display screen of the mobile terminal. For reducing the consumption, the display screen may be turned off.

In some embodiments, the method can further include that an orientation of the mobile terminal is determined, and the operation that the radar wave is transmitted includes that the radar wave is transmitted in the orientation of the mobile terminal. Herein, the orientation of the mobile terminal may be determined through an attitude sensor, namely the mobile terminal includes the attitude sensor, and the orientation of the mobile terminal is detected through the attitude sensor. The attitude sensor includes a three-axis gyroscope, a tri-axial accelerometer, a three-axis electronic compass, a compass, or other motion sensors.

The orientation of the mobile terminal may refer to a direction that the display screen in the display state of the mobile terminal faces. That is, no matter how many display screens the mobile terminal includes, the orientation of the mobile terminal is a direction that the presently used display screen faces when the user presently uses the mobile terminal. The direction includes the due south, the due east, the southeast, or other directions. When the mobile terminal is in a vertical state, the display screen in the display state of the mobile terminal may directly face a certain direction. When the mobile terminal is in an inclined state, a plane where the display screen in the display state of the mobile terminal forms a certain included angle with the ground, and in such case, an orientation of the display screen may be slightly lower or higher than the direction in the vertical state.

After the orientation of the terminal is acquired, the radar wave may be transmitted in the orientation to determine whether there is the occlusion causing the decrease of the acquired brightness value in the orientation. Therefore, a search range of the obstacle may be reduced, and processing cost may be reduced.

In some embodiments, the operation that the display brightness of the mobile terminal is adjusted according to the brightness value detected at the present moment can include that backlight brightness of the display module of the mobile terminal is adjusted according to the brightness value detected at the present moment.

Herein, the display module is set in the mobile terminal to enable the user to see the display resource, so that adjusting the display brightness of the mobile terminal specifically refers to adjusting the backlight brightness of the display module of the mobile terminal.

Herein, the operation that the backlight brightness of the display module of the mobile terminal is adjusted according to the brightness value detected at the present moment may be implemented as follows: an adjustment parameter corresponding to the decrease of the brightness value is determined, the display brightness of the mobile terminal at the present moment is acquired, and the display brightness of the mobile terminal is adjusted based on the adjustment parameter. The adjustment parameter corresponding to the brightness value may be preset as required. For example, the adjustment parameter corresponding to the decrease 70 LUX of the brightness value is set to be 0.7, and the adjustment parameter corresponding to the decrease 50 LUX of the brightness value is set to be 0.5. Since the ambient brightness value corresponding to the decrease 70 LUX changes more, a greater adjustment parameter may be set relative to the decrease 50 LUX. Therefore, after it is determined that there is the occlusion causing the decrease of the acquired brightness value in the environment, the backlight brightness of the display module of the mobile terminal may be triggered to be adjusted according to the brightness value to match the display brightness of the mobile terminal with the change of the environment and provide good user experience for the user.

In embodiments of the present disclosure, the backlight brightness of the display module of the mobile terminal may be adjusted through a driving circuit, namely a magnitude of a flowing current is controlled through the driving circuit to adjust the backlight brightness. The backlight source of the display module may be an OLED. For the OLED, under the action of electrodes of the driving circuit, holes generated by an anode and electrons generated by a cathode may move and, after moving to a luminous layer, may be combined into excitons, and the excitons are further attenuated during transition to emit light. Therefore, the numbers of the holes generated by the anode and the electrons generated by the cathode may be controlled through a driving voltage of the driving circuit to control the backlight brightness of the display module. Herein, the driving voltage is determined through the adjustment parameter corresponding to the decrease of the brightness value, and then the backlight brightness may further be adjusted.

Figure 5:
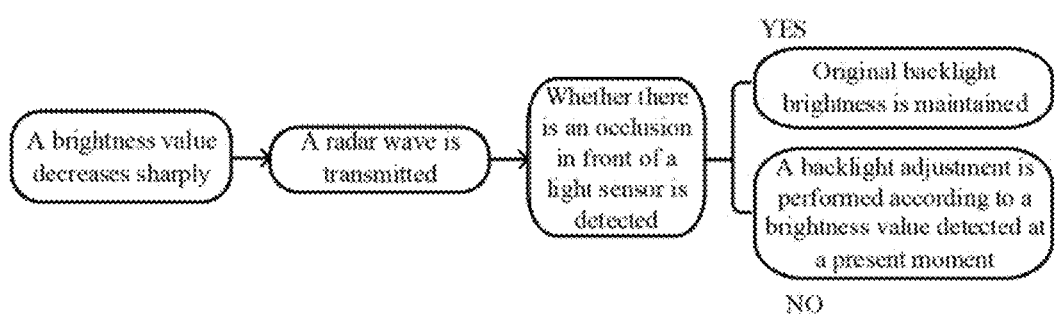
FIG. 5 is a third implementation flow chart showing a brightness adjustment method, according to an exemplary embodiment.

FIG. 5 is a third implementation flow chart showing a brightness adjustment method, according to an exemplary embodiment. As illustrated in FIG. 5, when the brightness value acquired by the light sensor of the mobile terminal at the present moment decreases sharply relative to the brightness value detected at the previous moment, the radar wave is transmitted, and whether there is the occlusion causing the decrease of the acquired brightness value in front of the light sensor is detected through the radar wave. If YES, then original backlight brightness is maintained. If NO, then a backlight adjustment is performed according to the brightness value detected at the present moment.

Accordingly, when the brightness of the environment where the mobile terminal is located changes greatly, whether there is the occlusion causing the decrease of the acquired brightness value in the environment where the mobile terminal is located is determined in a manner of transmitting the radar wave and detecting the echo of the radar wave; and when it is determined that there is no occlusion, the display brightness of the mobile terminal is adjusted. Whether the brightness of the environment changes greatly due to the occlusion may be judged according to the echo of the radar wave, misjudgments, caused by influence of existence of the occlusion on the light sensor, in an automatic adjustment of the brightness of the display screen may be greatly reduced, the display brightness may be adjusted more accurately, and user experience of the mobile terminal may be improved.

Figure 6:
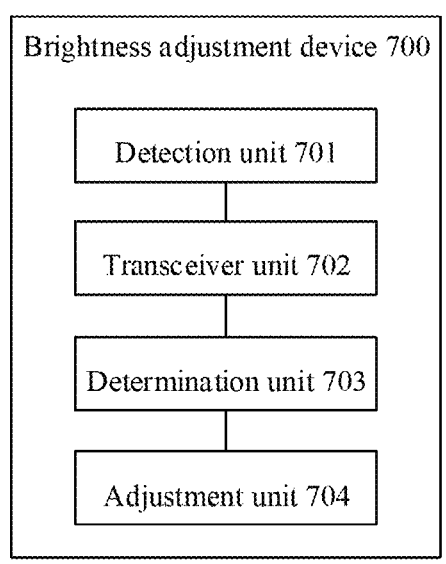
FIG. 6 is a structure diagram of a brightness adjustment device, according to an exemplary embodiment.

For improving adjustment accuracy of display brightness of a mobile terminal, embodiments of the present disclosure also provide a brightness adjustment device. FIG. 6 is a structure diagram of a brightness adjustment device, according to an exemplary embodiment. As illustrated in FIG. 6, the brightness adjustment device 700 can include a detection unit 701 that is configured to detect brightness of an environment where a mobile terminal is located to acquire a brightness value, and a transceiver unit 702 that is configured to, when a decrease of the brightness value acquired at a present moment relative to the brightness value acquired at a previous moment reaches a first preset value, transmit a radar wave and detect an echo of the radar wave. The device 700 can further include a determination unit 703 that is configured to determine whether there is an occlusion causing the decrease of the acquired brightness value according to a transmitting parameter of the radar wave and an echo parameter of the echo, and an adjustment unit 704 that is configured to, when it is determined that there is no occlusion, adjust display brightness of the mobile terminal according to the brightness value acquired at the present moment and, when it is determined that there is the occlusion, maintain the display brightness of the mobile terminal.

In some embodiments, the determination unit can further include an acquisition unit that is configured to acquire a feedback parameter of an object in a detection region of the radar wave according to the transmitting parameter of the radar wave and the echo parameter of the echo, and a determination subunit that is configured to determine whether there is the occlusion causing the decrease of the acquired brightness value according to the feedback parameter.

In some embodiments, the feedback parameter includes at least one of a distance parameter or a contour parameter. Further, the determination subunit includes at least one of a first processing unit that is configured to determine whether there is the occlusion of which a distance to the mobile terminal is in a preset occlusion distance range according to the distance parameter, or a second processing unit that is configured to determine whether the object is the occlusion according to the contour parameter.

In some embodiments, the device can further include a judgment unit that is configured to determine whether the brightness value acquired at the present moment is lower than a second preset value, the second preset value being lower than the first preset value, and a third processing unit that is configured to, when the brightness value acquired at the present moment is lower than the second preset value, determine whether there is a cover covering a display module of the mobile terminal according to the transmitting parameter of the radar wave and the echo parameter of the echo and, when it is determined that there is the cover covering the display module, control a screen of the mobile terminal to be turned off.

In some embodiments, the device can further include an orientation determination unit that is configured to determine an orientation of the mobile terminal. The transceiver unit can include a transmitting unit that is configured to transmit the radar wave in the orientation of the mobile terminal.

In some embodiments, the adjustment unit is configured to adjust backlight brightness of the display module of the mobile terminal according to the brightness value detected at the present moment.

With respect to the device in the above embodiment, the specific manners for performing operations for individual units therein have been described in detail in the embodiments regarding the method, which will not be elaborated herein.

Figure 7:
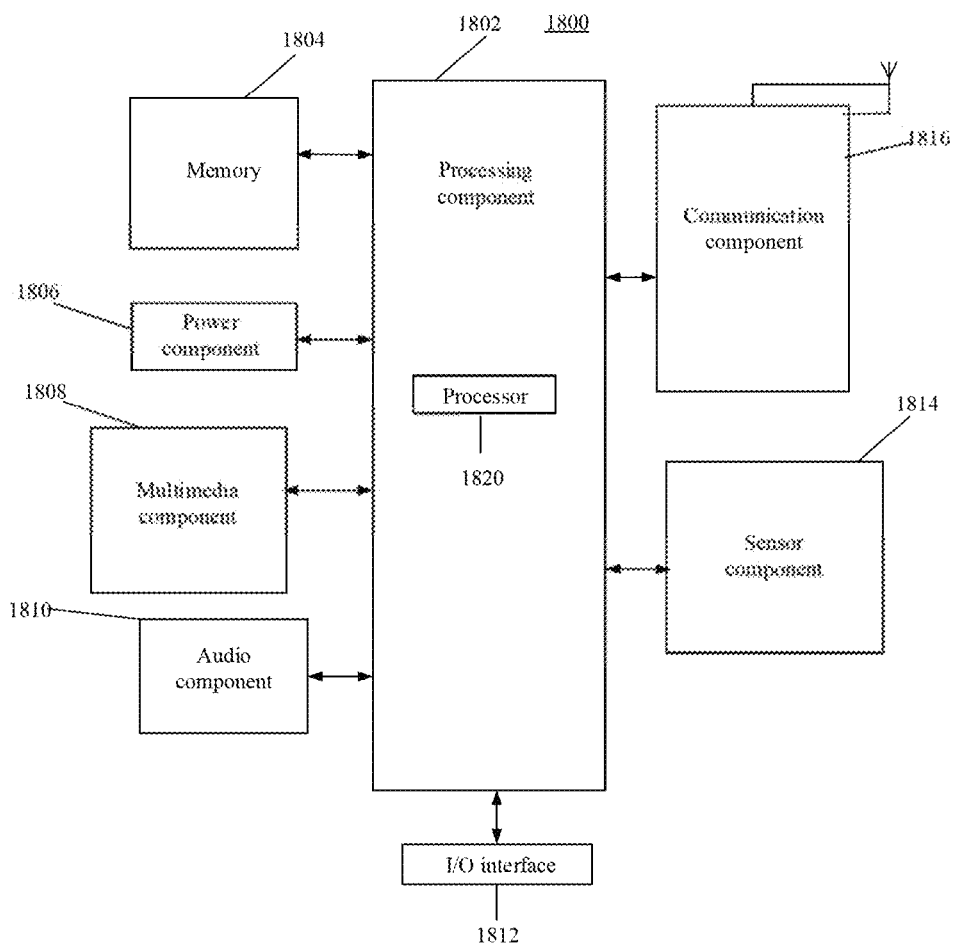
FIG. 7 is a block diagram of a brightness adjustment device, according to an exemplary embodiment.

FIG. 7 is a block diagram of a brightness adjustment device 1800, according to an exemplary embodiment. For example, the device 1800 may be a mobile phone, a computer, a digital broadcast terminal, a messaging device, a gaming console, a tablet, a medical device, exercise equipment, a personal digital assistant, and the like.

Referring to FIG. 7, the device 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the device 1800, such as the operations associated with display, telephone calls, data communications, camera operations, and recording operations. The processing component 1802 may include one or more processors 1820 to execute instructions to perform all or part of the steps in the abovementioned method. Moreover, the processing component 1802 may further include one or more modules which facilitate interaction between the processing component 1802 and other components. For instance, the processing component 1802 may include a multimedia module to facilitate interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, video, etc. The memory 1804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1806 provides power to various components of the device 1800. The power component 1806 may include a power management system, one or more power supplies, and other components associated with generation, management and distribution of power for the device 1800.

The multimedia component 1808 includes a screen providing an output interface between the device 1800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1808 includes a front camera and/or a rear camera. The front camera and/or the rear camera may receive external multimedia data when the device 1800 is in an operation mode, such as a photographing mode or a video mode. Each front camera and/or rear camera may be a fixed optical lens system or have focusing and optical zooming capabilities.

The audio component 1810 is configured to output and/or input an audio signal. For example, the audio component 1810 includes a microphone (MIC), and the MIC is configured to receive an external audio signal when the device 1800 is in an operation mode, such as a call mode, a recording mode and a voice recognition mode. The received audio signal may further be stored in the memory 1804 or sent through the communication component 1816. In some embodiments, the audio component 1810 further includes a speaker configured to output the audio signal.

The I/O interface 1812 provides an interface between the processing component 1802 and peripheral interface modules, such as a keyboard, a click wheel, buttons, and the like. The buttons may include, but are not limited to: a home button, a volume button, a starting button and a locking button.

The sensor component 1814 includes one or more sensors configured to provide status assessments in various aspects of the device 1800. For instance, the sensor component 1814 may detect an on/off status of the device 1800 and relative positioning of components, such as a display and small keyboard of the device 1800, and the sensor component 1814 may further detect a change in a position of the device 1800 or a component of the device 1800, presence or absence of contact between the user and the device 1800, orientation or acceleration/deceleration of the device 1800 and a change in temperature of the device 1800. The sensor component 1814 may include a proximity sensor configured to detect presence of an object nearby without any physical contact. The sensor component 1814 may also include a light sensor, such as a complementary metal oxide semiconductor (CMOS) or charge coupled device (CCD) image sensor, configured for use in an imaging application. In some embodiments, the sensor component 1814 may also include an acceleration sensor, a gyroscope sensor, a magnetic sensor, a pressure sensor or a temperature sensor.

The communication component 1816 is configured to facilitate wired or wireless communication between the device 1800 and other devices. The device 1800 may access a communication-standard-based wireless network, such as a wireless fidelity (WiFi) network, a 2nd-generation (2G) or 3rd-generation (3G) network or a combination thereof. In an exemplary embodiment, the communication component 1816 receives a broadcast signal or broadcast associated information from an external broadcast management system through a broadcast channel. In an exemplary embodiment, the communication component 1816 further includes a near field communication (NFC) module to facilitate short-range communications. For example, the NFC module may be implemented based on a radio frequency identification (RFID) technology, an infrared data association (IrDA) technology, an ultra-wide bond (UWB) technology, a Bluetooth (BT) technology, and other technologies.

In an exemplary embodiment, the device 1800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute any of the abovementioned methods.

In an exemplary embodiment, there is also provided a non-transitory computer-readable storage medium including instructions, such as included in the memory 1804, executable by the processor 1820 of the device 1800 for performing any of the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

According to a non-transitory computer-readable storage medium, instructions in the storage medium are executed by a processor to execute the brightness adjustment method in each abovementioned embodiment.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A brightness adjustment method that is applied to a mobile terminal, comprising:
   detecting a brightness of an environment where the mobile terminal is located to acquire a brightness value;
   transmitting a radar wave and detecting an echo of the radar wave when a decrease of the brightness value acquired at a present moment relative to the brightness value acquired at a previous moment reaches a first preset value;
   determining whether there is an occlusion causing the decrease of the acquired brightness value according to a transmitting parameter of the radar wave and an echo parameter of the echo;
   adjusting display brightness of the mobile terminal according to the brightness value acquired at the present moment when there is no occlusion; and
   maintaining the display brightness of the mobile terminal when the occlusion is present,
   wherein the first preset value refers to a threshold value configured to trigger the display brightness of the mobile terminal to be adjusted;
   further comprising:
   determining whether the brightness value acquired at the present moment is lower than a second preset value, the second preset value being lower than the first preset value;
   determining whether there is a cover covering a display module of the mobile terminal according to the transmitting parameter of the radar wave and the echo parameter of the echo when the brightness value acquired at the present moment is lower than the second preset value; and
   controlling a screen of the mobile terminal to be turned off when there is the cover covering the display module.

2. The method of claim 1, wherein the determining whether there is the occlusion causing the decrease of the acquired brightness value according to the transmitting parameter of the radar wave and the echo parameter of the echo further comprises:
   acquiring a feedback parameter of an object in a detection region of the radar wave according to the transmitting parameter of the radar wave and the echo parameter of the echo; and
   determining whether the occlusion is causing the decrease of the acquired brightness value according to the feedback parameter.

3. The method of claim 2, wherein:
   the feedback parameter further includes at least one of a distance parameter or a contour parameter, and
   determining whether the occlusion is causing the decrease of the acquired brightness value according to the feedback parameter includes at least one of:
      determining whether there is the occlusion of which a distance to the mobile terminal is in a preset occlusion distance range according to the distance parameter; or
      determining whether the object is the occlusion according to the contour parameter.

4. The method of claim 1, wherein adjusting the display brightness of the mobile terminal according to the brightness value acquired at the present moment further comprises:
   adjusting backlight brightness of a display module of the mobile terminal according to the brightness value acquired at the present moment.

5. A brightness adjustment device, comprising:
   a processor; and
   a memory for storing instructions executable by the processor,
   wherein the processor is configured to:
      detect brightness of an environment where a mobile terminal is located to acquire a brightness value;
      transmit a radar wave and detect an echo of the radar wave when a decrease of the brightness value acquired at a present moment relative to the brightness value acquired at a previous moment reaches a first preset value;
      determine whether there is an occlusion causing the decrease of the acquired brightness value according to a transmitting parameter of the radar wave and an echo parameter of the echo; and
      adjust display brightness of the mobile terminal according to the brightness value acquired at the present moment when there is no occlusion, and maintain the display brightness of the mobile terminal when the occlusion is present,
   wherein the first preset value refers to a threshold value configured to trigger the display brightness of the mobile terminal to be adjusted;
   wherein the processor is further configured to:
      determine whether the brightness value acquired at the present moment is lower than a second preset value, the second preset value being lower than the first preset value; and
      determine whether there is a cover covering a display module of the mobile terminal according to the transmitting parameter of the radar wave and the echo parameter of the echo when the brightness value acquired at the present moment is lower than the second preset value, and control a screen of the mobile terminal to be turned off when determining that there is the cover covering the display module.

6. The device of claim 5, wherein the processor is further configured to:
- acquire a feedback parameter of an object in a detection region of the radar wave according to the transmitting parameter of the radar wave and the echo parameter of the echo, and
- determine whether there is the occlusion causing the decrease of the acquired brightness value according to the feedback parameter.

7. The device of claim 6, wherein:
- the feedback parameter includes at least one of a distance parameter or a contour parameter, and
- the processor is further configured to perform at least of:
  - determining whether there is the occlusion of which a distance to the mobile terminal is in a preset occlusion distance range according to the distance parameter, or
  - determining whether the object is the occlusion according to the contour parameter.

8. The device of claim 5, wherein the processor is configured to adjust backlight brightness of a display module of the mobile terminal according to the brightness value acquired at the present moment.

9. A non-transitory computer-readable storage medium, instructions in the storage medium being executed by a processor of a brightness adjustment device to enable the brightness adjustment device to execute a brightness adjustment method that is applied to a mobile terminal, the brightness adjustment method comprising:
- detecting brightness of an environment where the mobile terminal is located to acquire a brightness value;
- transmitting a radar wave and detecting an echo of the radar wave when a decrease of the brightness value acquired at a present moment relative to the brightness value acquired at a previous moment reaches a first preset value;
- determining whether there is an occlusion causing the decrease of the acquired brightness value according to a transmitting parameter of the radar wave and an echo parameter of the echo;
- adjusting display brightness of the mobile terminal according to the brightness value acquired at the present moment when there is no occlusion; and
- maintaining the display brightness of the mobile terminal when the occlusion is present,
- wherein the first preset value refers to a threshold value configured to trigger the display brightness of the mobile terminal to be adjusted;

the brightness adjustment method further comprising:
- determining whether the brightness value acquired at the present moment is lower than a second preset value, the second preset value being lower than the first preset value;
- determining whether there is a cover covering a display module of the mobile terminal according to the transmitting parameter of the radar wave and the echo parameter of the echo when the brightness value acquired at the present moment is lower than the second preset value; and
- controlling a screen of the mobile terminal to be turned off when there is the cover covering the display module.

10. The non-transitory computer-readable storage medium of claim 9, wherein the determining whether there is the occlusion causing the decrease of the acquired brightness value according to the transmitting parameter of the radar wave and the echo parameter of the echo further comprises:
- acquiring a feedback parameter of an object in a detection region of the radar wave according to the transmitting parameter of the radar wave and the echo parameter of the echo; and
- determining whether the occlusion is causing the decrease of the acquired brightness value according to the feedback parameter.

11. The non-transitory computer-readable storage medium of claim 10, wherein:
- the feedback parameter includes at least one of a distance parameter or a contour parameter, and
- the determining whether there is the occlusion causing the decrease of the acquired brightness value according to the feedback parameter includes at least one of:
  - determining whether there is the occlusion of which a distance to the mobile terminal is in a preset occlusion distance range according to the distance parameter, or
  - determining whether the object is the occlusion according to the contour parameter.

12. The non-transitory computer-readable storage medium of claim 9, wherein the adjusting the display brightness of the mobile terminal according to the brightness value acquired at the present moment further comprises:
- adjusting backlight brightness of a display module of the mobile terminal according to the brightness value acquired at the present moment.

* * * * *